US012078159B2

United States Patent
Lohn et al.

(10) Patent No.: US 12,078,159 B2
(45) Date of Patent: Sep. 3, 2024

(54) SYSTEM FOR THERMAL INSULATION OF SUCTION MUFFLER IN COMPRESSORS

(71) Applicant: NIDEC GLOBAL APPLIANCE BRASIL LTDA., Joinville (BR)

(72) Inventors: Sergio Koerich Lohn, Joinville (BR); Rodrigo Kremer, Joinville (BR)

(73) Assignee: NIDEC GLOBAL APPLIANCE BRASIL LTDA., Joinville (BR)

( * ) Notice: Subject to any disclaimer, the term of this patent is extended or adjusted under 35 U.S.C. 154(b) by 257 days.

(21) Appl. No.: 17/635,685

(22) PCT Filed: Aug. 14, 2020

(86) PCT No.: PCT/BR2020/050322
§ 371 (c)(1),
(2) Date: Feb. 15, 2022

(87) PCT Pub. No.: WO2021/030892
PCT Pub. Date: Feb. 25, 2021

(65) Prior Publication Data
US 2022/0290662 A1 Sep. 15, 2022

(30) Foreign Application Priority Data
Aug. 16, 2019 (BR) .................. 10 2019 017126 0

(51) Int. Cl.
*F04B 39/00* (2006.01)
(52) U.S. Cl.
CPC .... *F04B 39/0061* (2013.01); *B32B 2307/102* (2013.01)

(58) Field of Classification Search
CPC ............... F04B 39/0061; B32B 2307/102
See application file for complete search history.

(56) References Cited

U.S. PATENT DOCUMENTS

| 2002/0071774 A1* | 6/2002 | Lee | F04B 39/0061 |
| | | | 181/403 |
| 2004/0179955 A1* | 9/2004 | Lee | F04B 39/0061 |
| | | | 417/312 |

(Continued)

FOREIGN PATENT DOCUMENTS

| CN | 1955464 A | 5/2007 |
| JP | S59-218323 A | 12/1984 |

(Continued)

OTHER PUBLICATIONS

International Search Report & Written Opinion of the International searching Authority issued in PCT Application No. PCT/BR2020/050322, mailed Nov. 27, 2020.

*Primary Examiner* — Forrest M Phillips
(74) *Attorney, Agent, or Firm* — FOLEY & LARDNER LLP

(57) ABSTRACT

The present invention relates to a system for the thermal insulation of the suction muffler in compressors, said system being provided with a muffling device and a protection device, and being capable of optimizing the thermal insulation of the refrigerant fluid that will be compressed, making the operation of the compressor more efficient; and in the proposed system, the muffling device and the protection device are connected via connection regions that allow the formation of a gap between the devices, which improves the operation thereof.

6 Claims, 3 Drawing Sheets

(56) References Cited

U.S. PATENT DOCUMENTS

| | | | |
|---|---|---|---|
| 2016/0102661 A1* | 4/2016 | Chou | F04B 53/103 |
| | | | 417/559 |
| 2016/0222954 A1* | 8/2016 | Kim | F04B 39/121 |
| 2016/0341190 A1* | 11/2016 | Yoo | F04B 39/12 |
| 2018/0238313 A1* | 8/2018 | Hahn | F04B 39/0061 |
| 2021/0180580 A1* | 6/2021 | Lim | F04B 39/0027 |

FOREIGN PATENT DOCUMENTS

| | | |
|---|---|---|
| JP | 2004-251131 A | 9/2004 |
| WO | WO-2006/092771 A1 | 9/2006 |

\* cited by examiner

SYSTEM FOR THERMAL INSULATION OF SUCTION MUFFLER IN COMPRESSORS

CROSS REFERENCE TO RELATED APPLICATIONS

This application is a national stage entry of PCT Application No. PCT/BR2020/050322, filed on Aug. 14, 2020, which claims priority to Brazilian Application No. 10 2019 017126 0, filed on Aug. 16, 2019, the entire contents of which are incorporated herein by reference.

FIELD OF THE INVENTION

The present invention relates to a system of suction muffler thermal insulation in compressors, which is provided with a silencing device and a protection device, said system capable of optimizing the thermal insulation, which is essential for the refrigerant fluid that will be compressed, making the compressor operation more efficient.

BACKGROUND OF THE INVENTION

As known by a person skilled in the art, the hermetic compressors have evolved technically over time, increasingly having a highly efficient operation and free of loud noises. With regard specifically to noise, one component is of particular importance, the suction silencer, also known as the suction muffler.

The suction silencer or suction muffler has the function of mitigating the undesirable effects generated by the pressure pulsations of the fluid, such as vibrations and acoustic noise. However, since it is exposed to the internal operating environment of a hermetic compressor, the silencer ends up suffering from thermal variations that affect the temperature of the fluid in compression, consequently affecting the efficiency of the compressor as a whole.

In particular, one of the regions that most contributes to the "overheating" of the refrigerant fluid is the "neck region" of the muffler. This region takes the refrigerant fluid to the suction valve and is very close to the hot parts of the compressor head, unduly favoring the heat exchange between metal parts of the head and the fluid.

For this reason, the systems of muffler thermal insulation are, in many cases, provided with additional elements designed to protect it or increase its efficiency when operating. In this sense, the solutions exemplified in patent documents CN1955464 and JP2004251131 stand out.

Document CN1955464, for example, discloses a suction muffler in which the discharge pipe comprises a thermal insulation layer formed at a predetermined distance from an outer wall and an inner wall. A second thermal insulation layer is also provided between the discharge pipe and a valve plate. However, although said document includes a means of protection for the silencing element, it is possible to note that this does not describe or provide any means of facilitated connection between the protection element and the silencing element. Furthermore, CN1955464 does not provide for any condition in which the spacing between the protective element (thermal insulator) and the "neck region" of the muffler is filled with refrigerant fluid from the compressor.

The document JP2004251131, in turn, describes a suction silencing element (muffler) whose communication pipe is associated with at least a thermal insulation layer conformed/maintained under vacuum, in order to avoid thermal transfer by convection. Again, a prior art which does not provide any means for easy connection between the protection element and the silencing element and, also, does not describe or predicts the existence of the spacing (gap) between the thermal insulation and the "neck region" of the silencing element and, consequently, it does not provide for filling this space with refrigerant fluid from the compressor.

Further, document US 2004/179955 discloses a suction muffler, a compressor with the suction muffler, and an apparatus having a refrigerant circulation circuit including the compressor.

Additionally, document WO 2006/092771 describes a compressor with an enhanced volumetric efficiency, by storing the refrigerant fluid received from the evaporator in the refrigerant cycle, in a small sized and well insulated refrigerant chamber.

In addition, document JP S59 218323 discloses a noise eliminating box of a suction muffler between a valve cover mounted to a cylinder of a closed compressor and a suction pipe. A wall of the noise eliminating box is constituted of an outside sound-insulating layer made of metallic materials and an inside heat-insulating layer made, for example, of synthetic resin material.

Thus, it is based on the deficiencies noted in the prior art that the present invention arises.

OBJECTIVES OF THE INVENTION

Therefore, the primary objective of the present invention is to reveal a system of suction muffler thermal insulation in compressors, preferably hermetic compressors, this system comprising a protective device and a silencing device.

Furthermore, it is an objective of the present invention to provide a system of muffler thermal insulation in which the protection device is connected to the silencing device using the interaction between at least a connection region in said protection device with at least a portion of the connection region on the silencing device.

Also, it is an objective of the present invention to provide a system of muffler thermal insulation able to optimize the thermal insulation of the refrigerant fluid that will be compressed, making the compressor operation more efficient.

It is an additional objective of the present invention to provide a system of muffler thermal insulation that allows the formation of a gap between the silencing device and the protection device, a gap that can be filled by the refrigerant fluid when operating the compressor.

SUMMARY OF THE INVENTION

All aforementioned objectives are fully achieved using a system of suction muffler thermal insulation in compressors comprising a protective device and a silencing device; the silencing device is provided with a body, a cavity, a constricted region, and an upper region, wherein the body of the silencing device has a wall that defines an outer face and an inner face. The system of muffler thermal insulation wherein the silencing device comprises also, at least, a connection region from the wall of their body. Similarly, the protective device comprises a body with a wall that defines an outer face and an inner face; the wall of the body of the protective device comprises at least a connection region. The system of suction muffler thermal insulation being such that the protection device is connected to the silencing device using the interaction between at least a connection region in said protection device with at least a portion of the connection region in said silencing device. Additionally, the inner face of the protection device has a distance of up to 5.0 mm from the outer face of the silencing device in order to define a gap, and the protection device is attached to the silencing device by a spring that tightens the suction muffler.

Additionally, a system of muffler thermal insulation is provided, in which the connection region of the silencing device defines a protrusion from the outer face of the wall of said silencing device.

The system of muffler thermal insulation in which the connection region of the protection device defines a recess from the inner face of the wall of the said protection device.

Furthermore, the present invention provides a system of muffler thermal insulation in which the protection device wraps the constricted region and the upper region of the silencing device.

A system of muffler thermal insulation according to the present invention in which the body of the protection device comprises a cavity, a constricted region, and an upper region.

Furthermore, the present invention provides a system of muffler thermal insulation in which the body of the protection device consists of one or multiple layers of metallic and/or polymeric material.

BRIEF DESCRIPTION OF THE FIGURES

The present invention is detailed based on the figures listed below, in which.

DETAILED DESCRIPTION OF THE INVENTION

Figure 1:
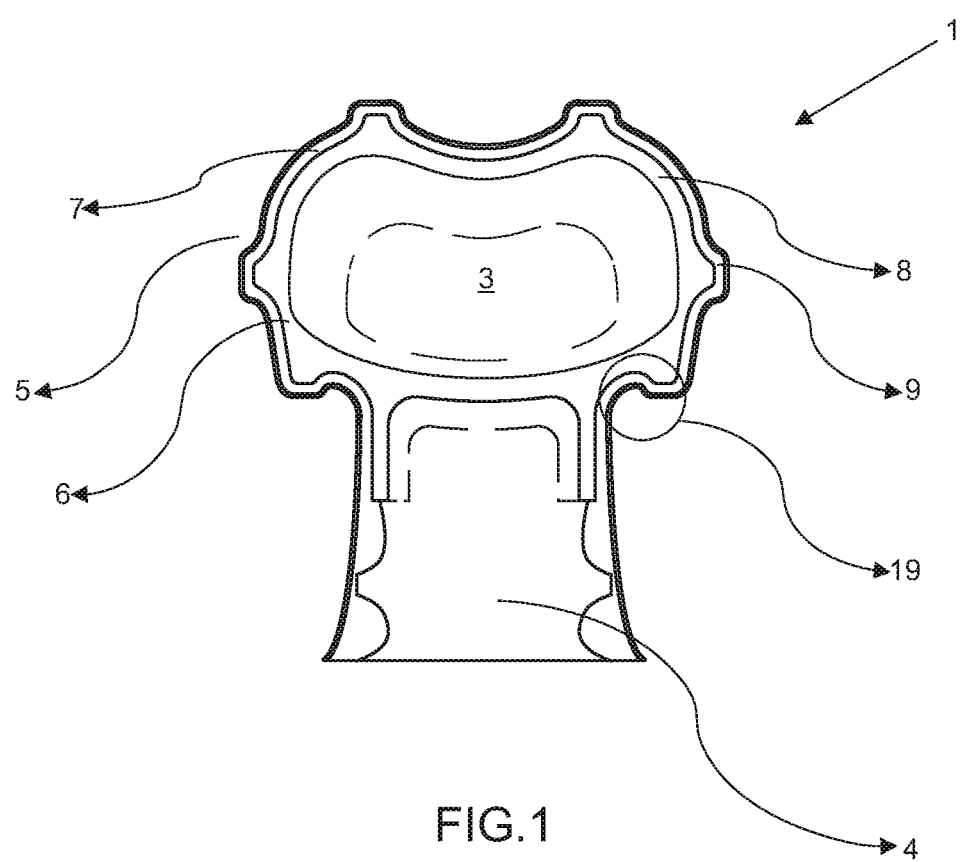
FIG. 1 illustrates a view of the system of muffler thermal insulation in which the protection device is connected to the silencing device through the connection regions.

Following the objectives of the present invention, it is revealed that a system of suction muffler thermal insulation which is preferably applied in hermetic type compressors. As can be seen in FIG. 1, the system of muffler thermal insulation under consideration is provided with a protection device 10 and a silencing device 1.

Especially, the silencing device 1 is provided with a body, a cavity 3, a constricted region 4, an upper region 5, wherein the body of the silencing device 1 has a wall 6 that defines an outer face 7 and an inner face 8. Furthermore, the silencing device 1 comprises at least a connection region 9 from the wall 6 of his body.

For informational purposes, said constricted region 4 of the silencing device 1 can be commonly called "neck region".

Figure 2:
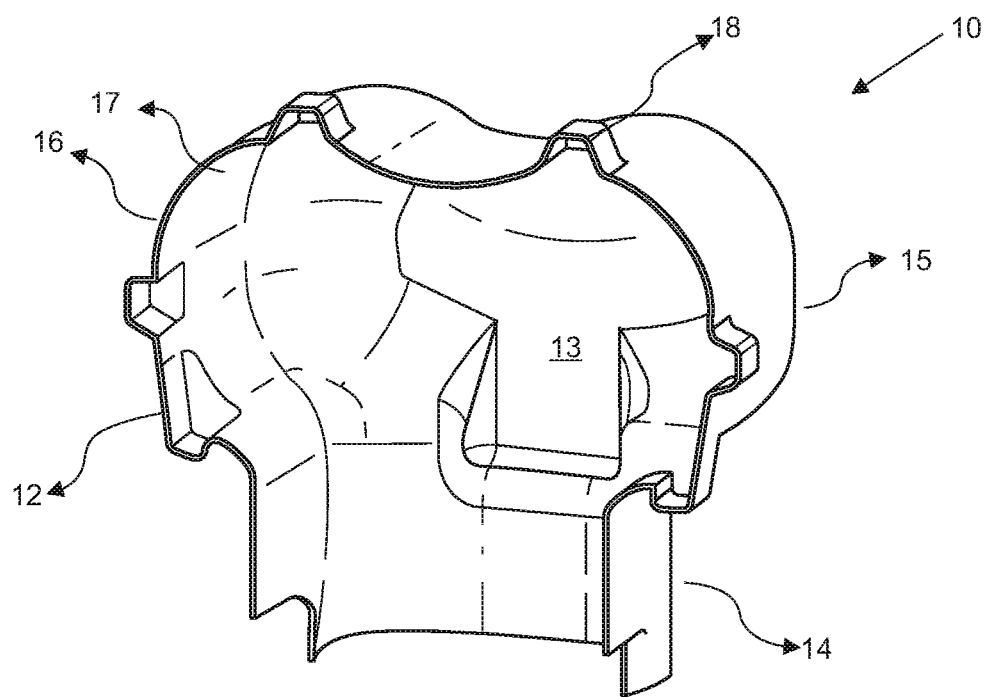
FIG. 2 illustrates a perspective view of the protection device showing its internal cavity and the connection regions on its body wall.

In turn, and as seen in FIG. 2, the protection device 10 comprises a body having a wall 12 defining an outer face 16 and an inner face 17. Furthermore, and in a preferred embodiment, the protective device 10 comprises a cavity 13, a constricted region 14, and an upper region 15. In a preferred embodiment, the wall 12 of the body can further comprise at least a connecting region 18.

The previously provided description of the elements of the system of muffler thermal insulation shows that, preferably, the protective device 10 is designed to have a geometry similar or in agreement with the silencing device 1. This is because the protective device 10 must function as a cover, wrapper, or wrapping element for the silencing device 1.

Figure 3:
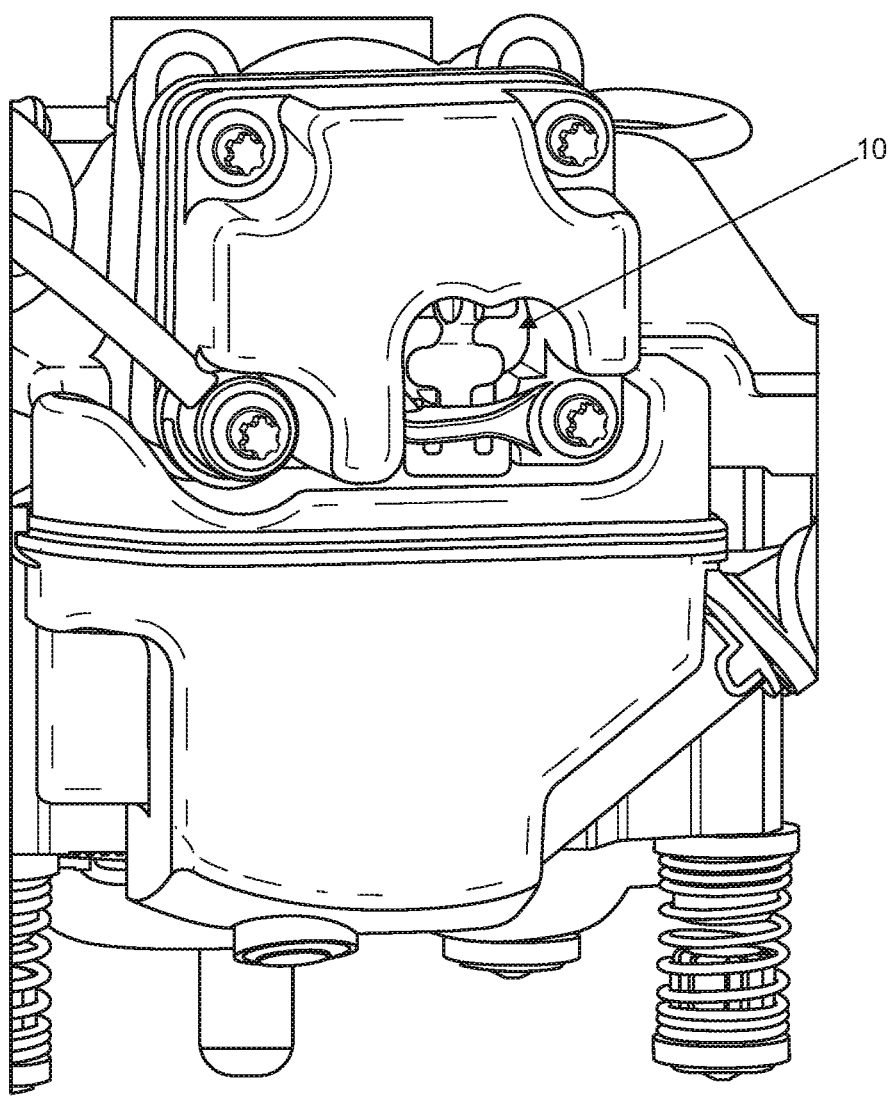
FIG. 3 illustrates a view of the system of muffler thermal insulation mounted on the hermetic compressor.

The assembly of the system of muffler thermal insulation is such that the protection device 10 is connected to the silencing device 1 through the interaction between at least a connection region 18 in the protection device 10 with at least a portion of the connection region 9 on the silencing device 1. In this way, the protective device 10 is quickly, conveniently, and safely coupled to the silencing device 1. It is important to highlight that the fixing of the protection device 10 can be done by the spring, which commonly tightens the suction muffler. Thus, the spring tightens the protective device 10 which tightens the silencing device 1 (muffler). FIG. 3 shows this diagram.

Here, it should be highlighted that additional connection and fixing elements may be applied to maintain the assembly of the system of muffler thermal insulation, such as rivets, screws, adhesives, or other interference fitting elements. However, and in a preferable embodiment, the protective device 10 is fixed by the spring that tightens the suction muffler. Thus, the spring tightens the protective device 10 which tightens the silencing device 1. FIG. 3 shows this diagram.

Specifically, detailing the connection region 18, it can be seen in FIG. 2 that it defines a recess from the inner face 17 of the wall 12 of the protection device 10. Preferably this recess has a curvilinear shape (arching), but it can vary, as long as it guarantees the connection between the desired elements. It should be highlighted that, in another embodiment, not part of the invention, the connection region 18 can characterize a protrusion from the inner face 17 of the wall 12 of the protection device 10.

In turn, the connection region 9 defines a protrusion that extends from the outer face 7 on the wall 6 of the silencing device 1, and preferably this protrusion has a curvilinear shape but is not restricted to this geometry. Furthermore, in another embodiment, not part of the invention, the connection region 9 can characterize a recess from the outer face 7 of the wall 6 of the silencing device 1.

Based on the present description, it remains clear that the connection regions 18 and 9 must be such that they comply with each other, so that their geometry allows the reciprocal connection, that is, if the connection region 18 defines a recess, the connection region 9 should set a protrusion and the reverse must also be true. In addition, it should be highlighted that the position in which the connection regions 18 and 9 are provided, in the silencing device 1/protection device 10, must also comply with each other so that the regions fit together when assembling these elements, as can be seen in FIG. 1.

This, too, because the protective device 10 is such that it wraps the body of the silencing device 1. In a preferred embodiment, the protection device wraps the constricted region 4 and the upper region 5 of the silencing device 1. In different embodiments, not part of the invention, the protection device 10 can be provided to wrap only the constricted region 4 ("neck region") or just the upper region 5 of the silencing device 1.

In another preferred embodiment, not part of the invention, the connection region 18 can be such that it passes through the wall 12 of the body of the protection device 10, defining orifices in the surface of the protection device 10.

Still, as shown in FIG. 1, it should be highlighted that the inner face 17 of the protection device 10, when connected to the silencing device 1, presents a departure from the outer face 7 of said silencing device 1. This spacing defines a gap 19, which preferably has a width of up to 5.0 mm.

In another preferred embodiment, not part of the invention, the gap 19 may be filled by a layer of an additional protective (thermal and/or acoustic) material or filled with refrigerant fluid. These variations aim to meet the design and specificity of each compressor type to which the system of muffler thermal insulation can be applied.

In particular, the constricted region 4, also called the "neck region" of the silencing device 1 (muffler) is wrapped by the constricted region 14 of the protection device, so that gap 19 is provided at this location. Thus, when operating the compressor, this location, that is, the gap 19, can be filled with refrigerant fluid. Thus, the thermal insulation capacity is optimized.

Additionally, it should be highlighted that the system of muffler thermal insulation proposed herein allows a fluid "gap" to be formed between the "neck region" of the silencing device 1 with the other components of the head, especially metal parts of the compressor head. Therefore, the proposed solution introduces additional thermal resistances (thermal insulation) to the heat transfer to the fluid, minimizing its heating inside the "neck region" of the silencing device 1 (muffler).

Finally, concerning the protection device 10, its body may consist of one or multiple layers of whether metallic and/or polymeric material, or any material that meets the operating specifications of this element.

In general terms, the present specification makes it clear that the system of suction muffler thermal insulation now proposed presents a configuration capable of optimizing the thermal insulation of the refrigerant fluid that will be compressed, making the operation of the compressor more efficient. By using connection regions, the system has a silencing device 1 and a protection device 10, which are simple to assemble.

It is important to highlight that the present description has the sole purpose of describing, in an exemplary way, the particular embodiment of the invention under consideration.

The invention claimed is:

1. A system of a suction muffler thermal insulation in compressors comprising a protection device (10) and a silencing device (1);

the silencing device (1) provided with a body, a cavity (3), a constricted region (4), an upper region (5);
the body with a wall (6) that defines an outer face (7) and an inner face (8), wherein:
 the silencing device (1) comprises at least a first connection region (9) from the wall (6);
the protection device (10) comprises a second body with a second wall (12) that defines a second outer face (16) and a second inner face (17), wherein:
 the wall (12) comprising at least one second connection region (18);
 the protection device (10) being connected to the silencing device (1) via an interaction between the at least one second connection region (18) with at least the first connection region (9);
 wherein the second inner face (17) of the protection device (10) has a distance of up to 5.0 mm from the outer face (7) of the silencing device (1) in order to define a gap (19); and
 wherein the protection device (10) is attached to the silencing device (1) by a spring that tightens the suction muffler.

2. The system according to claim 1, wherein the first connection region (9) defines a protrusion from the outer face (7) in the wall (6) of the silencing device (1).

3. The system according to claim 1, wherein the second connection region (18) defines a recess from the second inner face (17) of the wall (12) of the protective device (10).

4. The system according to claim 1, wherein the protection device (10) wraps the constricted region (4) and the upper region (5) of the silencing device (1).

5. The system according to claim 1, wherein the body of the protection device (10) comprises a second cavity (13), a second constricted region (14), and a second upper region (15).

6. The system according to claim 1, wherein the body of the protection device (10) consists of one or multiple layers of metallic and/or polymeric material.

* * * * *